(12) United States Patent
Nishino

(10) Patent No.: US 9,632,738 B2
(45) Date of Patent: Apr. 25, 2017

(54) IMAGE FORMING SYSTEM AND IMAGE FORMING APPARATUS

(71) Applicant: KYOCERA Document Solutions Inc., Osaka (JP)

(72) Inventor: Tetsuya Nishino, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/974,703

(22) Filed: Dec. 18, 2015

(65) Prior Publication Data

US 2016/0188267 A1     Jun. 30, 2016

(30) Foreign Application Priority Data

Dec. 26, 2014  (JP) ................................. 2014-263973

(51) Int. Cl.
*G06F 3/12*     (2006.01)

(52) U.S. Cl.
CPC ............ *G06F 3/126* (2013.01); *G06F 3/1204* (2013.01); *G06F 3/1267* (2013.01); *G06F 3/1274* (2013.01); *G06F 3/1291* (2013.01); *Y02B 60/1271* (2013.01)

(58) Field of Classification Search
None
See application file for complete search history.

(56) References Cited

U.S. PATENT DOCUMENTS

| 2008/0259399 | A1* | 10/2008 | Wada ................... | G06F 3/1204 |
| | | | | 358/1.15 |
| 2009/0040017 | A1  | 2/2009  | Nagasawa ............... | 340/5.2 |
| 2009/0128853 | A1* | 5/2009  | Kusakabe ............ | G06F 3/1204 |
| | | | | 358/1.15 |
| 2016/0077774 | A1* | 3/2016  | Okada ................... | G06F 3/1212 |
| | | | | 358/1.15 |

FOREIGN PATENT DOCUMENTS

| JP | 2005-039466 | * | 2/2005 |
| JP | 2005-39466 A |   | 2/2005 |
| JP | 2005-189971 | * | 7/2005 |
| JP | 2008-165540 A |   | 7/2008 |
| JP | 2009-44617 A |   | 2/2009 |
| JP | 2010-228419 | * | 10/2010 |
| JP | 2013-39789 A |   | 2/2013 |
| JP | 2013-250705 | * | 12/2013 |
| WO | WO 2013/027475 A1 |   | 2/2013 |

OTHER PUBLICATIONS

Japanese Office Action dated Jul. 8, 2016, issued by the Japanese Patent Office in corresponding application JP 2014-263973.

\* cited by examiner

*Primary Examiner* — Fan Zhang
(74) *Attorney, Agent, or Firm* — Stein IP, LLC

(57) ABSTRACT

At least one of a plurality of image forming apparatuses in an image forming system is a report accepting image forming apparatus that accepts a last exit report. Upon accepting the last exit report, the report accepting image forming apparatus executes a last exit process and transmits, to any other of the plurality of image forming apparatuses in the (Continued)

image forming system listed on a list, a last exit notification including a command for commanding the any other of the plurality of image forming apparatuses to execute the last exit process so that the any other of the plurality of image forming apparatuses also executes the last exit process.

4 Claims, 7 Drawing Sheets

IMAGE FORMING SYSTEM AND IMAGE FORMING APPARATUS

INCORPORATION BY REFERENCE

This application is based on and claims the benefit of priority from Japanese Patent Application No. 2014-263973 filed on Dec. 26, 2014, the contents of which are hereby incorporated by reference.

BACKGROUND

The present disclosure relates to an image forming system composed of a plurality of image forming apparatuses communicably connected to each other and to such an image forming apparatus.

Conventionally, as an image forming system, there is known a printing system including an entry/exit management apparatus. The entry/exit management apparatus included in the conventional image forming system (printing system) manages a user's entry into an installation area (specific area) of the image forming system and a user's exit from the installation area of the image forming system. Furthermore, the conventional image forming system also includes a printing job holding apparatus that holds a printing job, an image forming apparatus (printing apparatus) that executes, based on a printing job, a printing process, and so on.

In the conventional image forming system, when a user exits from the installation area of the image forming system, a printing job of the user is set as an object to be deleted. Then, at a prescribed timing, the printing job set as the object to be deleted is deleted from the printing job holding apparatus.

SUMMARY

An image forming system according to a first aspect of the present disclosure is an image forming system composed of a plurality of image forming apparatuses communicably connected to each other. At least one of the plurality of image forming apparatuses is a report accepting image forming apparatus that accepts a last exit report from a last exiting person who exits last from an installation area of the image forming system. The report accepting image forming apparatus stores a list indicating the plurality of image forming apparatuses. Upon accepting the last exit report, the report accepting image forming apparatus executes a last exit process preset as a process to be executed when the last exiting person exits from the installation area and transmits, to any other of the plurality of image forming apparatuses listed on the list, a last exit notification including a command for commanding the any other of the plurality of image forming apparatuses to execute the last exit process so that the any other of the plurality of image forming apparatuses listed on the list also executes the last exit process.

An image forming apparatus according to a second aspect of the present disclosure is an image forming apparatus in an image forming system composed of a plurality of image forming apparatuses communicably connected to each other. The image forming apparatus includes a communication portion, a storage portion, a reception portion, and a control portion. The communication portion communicates with any other of the plurality of image forming apparatuses in the image forming system. The storage portion stores a list indicating the plurality of image forming apparatuses. The reception portion accepts a last exit report from a last exiting person who exits last from an installation area of the image forming system. The control portion executes a last exit process preset as a process to be executed when the last exiting person exits from the installation area. Upon the reception portion accepting the last exit report, the control portion executes the last exit process and instructs the communication portion to transmit, to the any other of the plurality of image forming apparatuses listed on the list, a last exit notification including a command for commanding the any other of the plurality of image forming apparatuses to execute the last exit process so that the any other of the plurality of image forming apparatuses listed on the list also executes the last exit process.

DETAILED DESCRIPTION

<Overall Configuration of Image Forming System>

Figure 1:
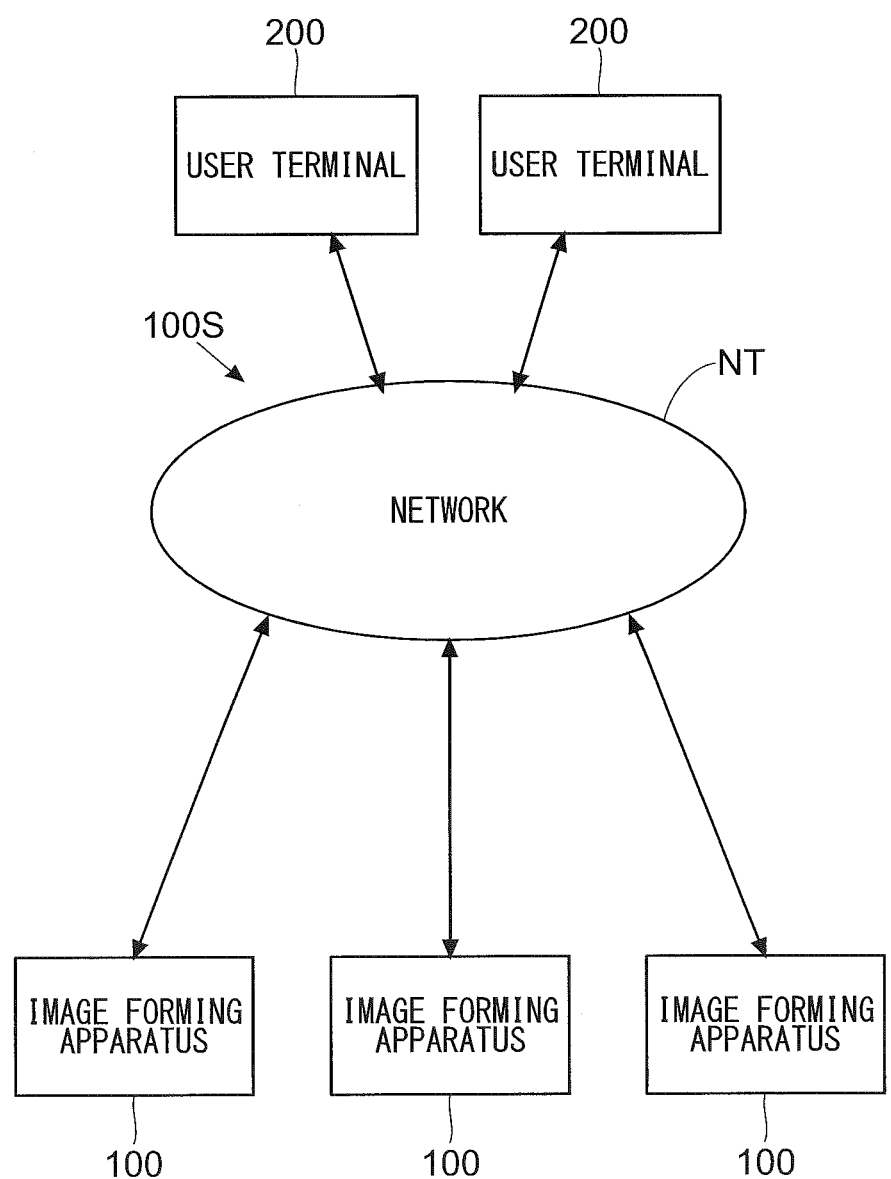
FIG. 1 is a schematic diagram of an image forming system according to one embodiment of the present disclosure.

As shown in FIG. 1, an image forming system 100S of this embodiment is composed of a plurality of image forming apparatuses 100. The plurality of image forming apparatuses 100 are communicably connected to each other via a network NT. Furthermore, a user terminal 200 that is a personal computer used by a user also is connected to the network NT. This allows the plurality of image forming apparatuses 100 to communicate also with the user terminal 200.

Here, there is no particular limitation on the type of the image forming apparatuses 100 included in the image forming system 100S, and the image forming apparatuses 100 are constituted by, for example, a printer apparatus or a multifunctional peripheral. Moreover, there is also no particular limitation on the number of installations of the image forming apparatuses 100 included in the image forming system 100S. For example, while in FIG. 1, three image forming apparatuses 100 are installed, two or not less than four image forming apparatuses 100 may be installed.

<Configuration of Image Forming Apparatus>

The image forming apparatuses 100 are constituted by, for example, a multi-functional peripheral equipped with a plurality of types of functions such as a printer function and a copy function. The plurality of image forming apparatuses 100 in the image forming system 100S may mutually have the same configuration or different configurations. Hereinafter, as one example, a description is given on the assumption that the plurality of image forming apparatuses 100 mutually have the same configuration (and, therefore, the plurality of image forming apparatuses 100 may also be referred to singularly as an image forming apparatus).

Figure 2:
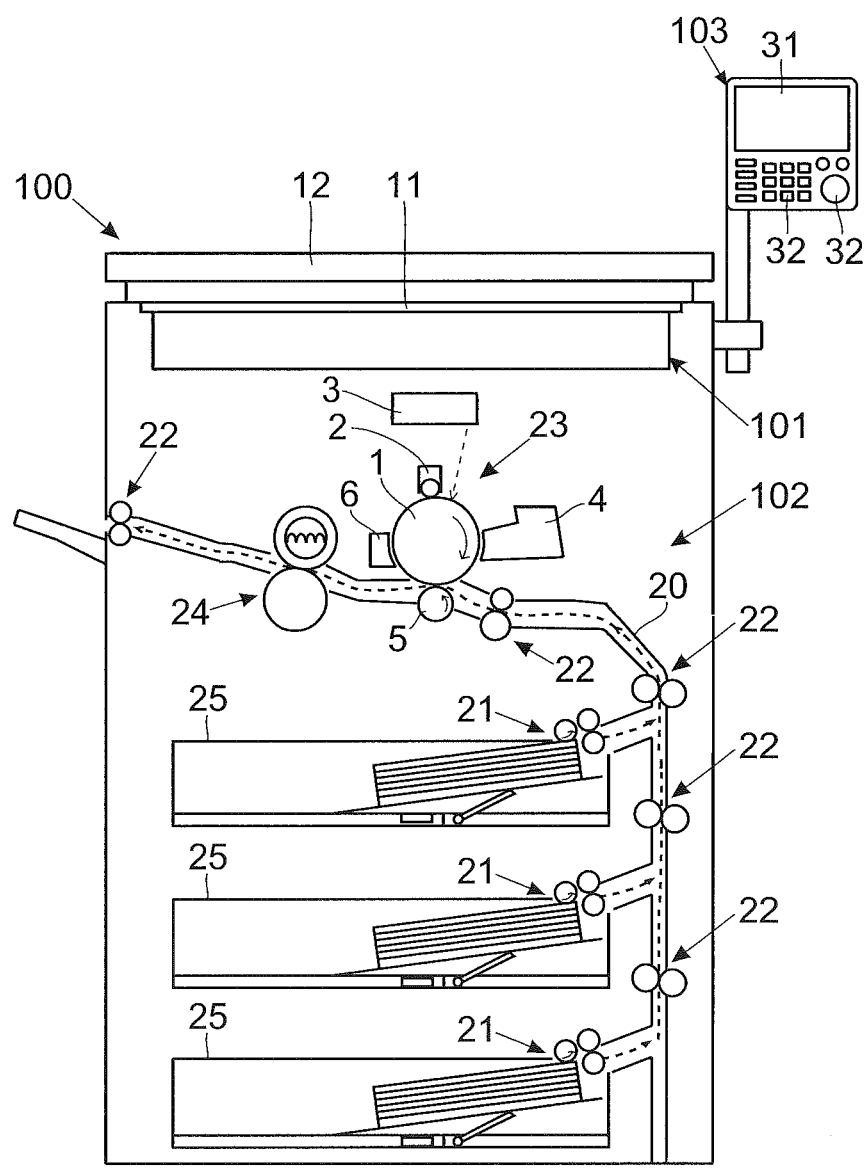
FIG. 2 is a diagram showing an overall configuration of an image forming apparatus according to the one embodiment of the present disclosure.

As shown in FIG. 2, the image forming apparatus 100 includes an image reading portion 101, a printing portion 102, and an operation panel 103.

The image reading portion 101 has a contact glass 11. Further, the image reading portion 101 reads an original document placed on the contact glass 11 to generate image data of the original document. The original document placed on the contact glass 11 can be held down by an original document cover 12.

The printing portion 102 prints, on a paper sheet, an image based on image data and ejects the paper sheet on which the image has been printed. For example, the printing portion 102 prints, on a paper sheet, an image based on image data transmitted from the user terminal 200 (see FIG. 1). Or alternatively, the printing portion 102 prints, on a paper sheet, an image based on image data of an original document obtained by reading the original document by the image reading portion 100.

The printing portion 102 includes a paper feed portion 21, a paper sheet conveying portion 22, an image forming portion 23, and a fixing portion 24. The paper feed portion 21 supplies a paper sheet housed in a paper sheet cassette 25 to a paper sheet conveying path 20. The paper sheet conveying portion 22 conveys a paper sheet along the paper sheet conveying path 20. The image forming portion 23 includes a photosensitive drum 1, a charging device 2, an exposure device 3, a developing device 4, a transfer roller 5, and a cleaning device 6. Further, the image forming portion 23 forms, based on image data, a toner image and transfers the toner image onto a paper sheet. The fixing portion 24 fixes a toner image transferred onto a paper sheet by applying heat and pressure thereto The operation panel 103 includes a liquid crystal display panel 31 having a touch panel thereon. The liquid crystal display panel 31 displays soft keys and any message for accepting various types of settings and so on. Furthermore, on the operation panel 103, hard keys 32 such as a start key and a numeric keypad are provided.

Figure 3:
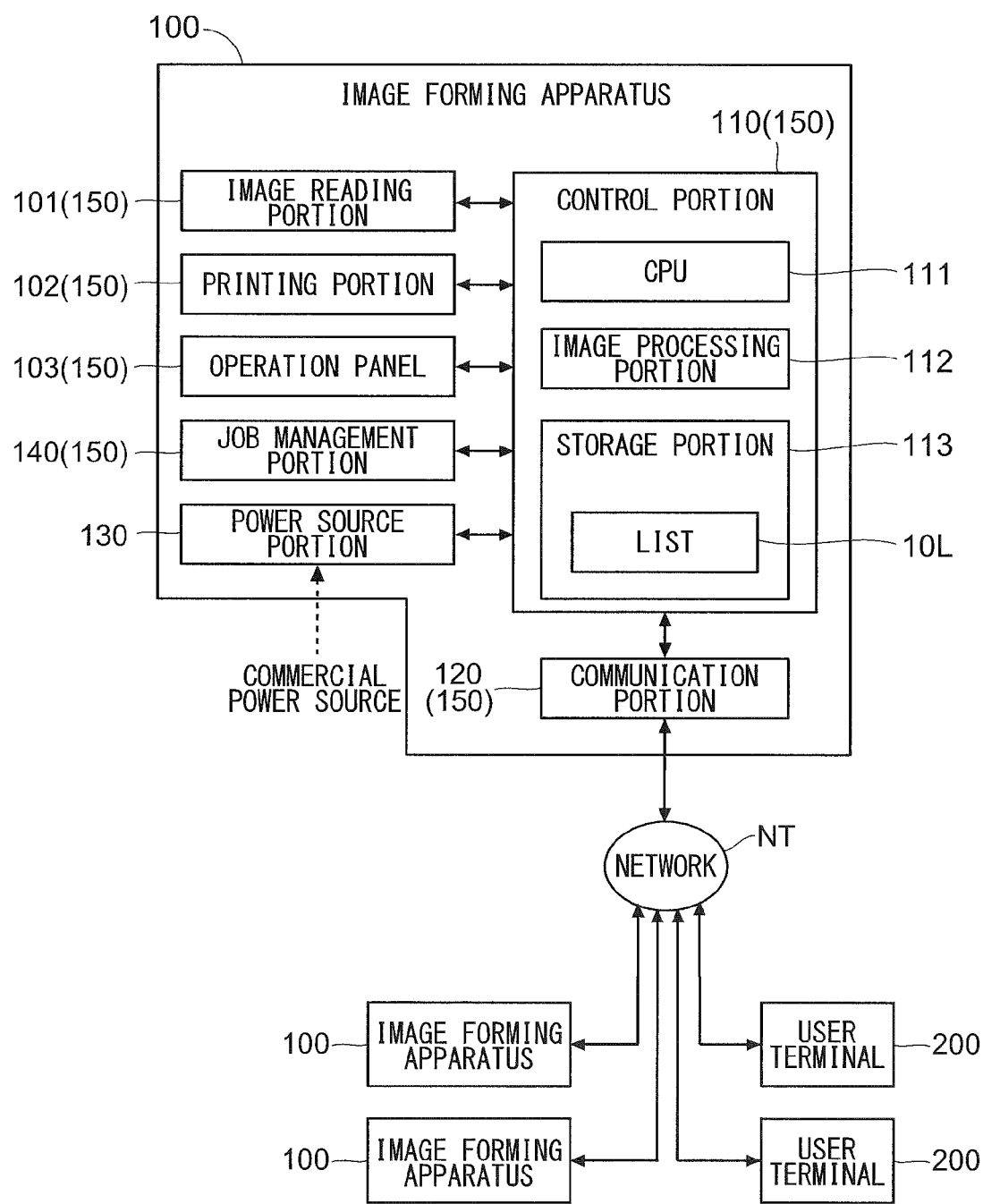
FIG. 3 is a diagram showing a hardware configuration of the image forming apparatus according to the one embodiment of the present disclosure.

Furthermore, as shown in FIG. 3, the image forming apparatus 100 includes a control portion 110. The control portion 110 includes a CPU 111, an image processing portion 112, and a storage portion 113. The storage portion 113 stores programs and data for control. Further, based on the programs and data for control stored in the storage portion 113, the control portion 110 performs overall control of the image forming apparatus 100. For example, the control portion 110 (image processing portion 112) performs various types of image processing with respect to image data. Furthermore, the control portion 110 controls a reading operation of the image reading portion 101 and a printing operation of the printing portion 102. Moreover, the control portion 110 controls a display operation of the operation panel 103 and detects an operation performed with respect to the operation panel 103.

A communication portion 120 is connected to the control portion 110. The communication portion 120 is communicably connected to any other apparatus (any other image forming apparatus 100) in the image forming system 100S and to the user terminal 200.

For example, the communication portion 120 receives a printing job from the user terminal 200. The printing job includes image data of an image to be printed, printing conditions (set values of various types of setting items such as the number of copies, a paper sheet size, single-sided/double-sided printing, aggregate printing, a printing concentration, and a printing magnification), user information (information on a transmission source from which the printing job has been transmitted), and so on. Further, upon the communication portion 120 receiving a printing job from the user terminal 200, the control portion 110 controls the printing portion 102 to perform a printing process based on the printing job.

Furthermore, a power source portion 130 is connected to the control portion 110. The power source portion 130 is connected to a commercial power source. Further, under an instruction from the control portion 110, the power source portion 130 generates a voltage necessary to operate a power-supplied portion 150 (an operation portion that operates using power supplied thereto) of the image forming apparatus 100 and supplies power to the power-supplied portion 150. The image reading portion 101, the printing portion 102, the operation panel 103, the control portion 110, the communication portion 120, and so on each correspond to the power-supplied portion 150. Furthermore, an aftermentioned job management portion 140 also corresponds to the power-supplied portion 150.

Here, the image forming apparatus 100 is equipped with, as a power supply mode, a normal mode and a power saving mode (sleep mode). The normal mode is a mode in which power supply to the power-supplied portion 150 is performed in a normal manner. The power saving mode is a mode in which power supply to the power-supplied portion 150 is restricted to a level lower than that in the normal mode.

When in the normal mode, the power source portion 130 supplies power to all the power-supplied portions 150. On the other hand, when a shift has been made from the normal mode to the power saving mode, the power source portion 130 supplies power only to part of the power-supplied portions 150 and cuts off power supply to the rest of the power-supplied portions 150.

When a shift condition from the normal mode to the power saving mode is met, the control portion 110 effects a shift from the normal mode to the power saving mode. For example, the control portion 110 measures a time (non-use time) that has elapsed without the image forming apparatus 100 being used, and in a case where the non-use time exceeds a preset threshold time, the shift condition is considered to be met, in which case the control portion 110 effects a shift from the normal mode to the power saving mode. Or alternatively, also in a case where the operation panel 103 has accepted an instruction to effect a shift from the normal mode to the power saving mode, the shift condition is considered to be met, in which case the control portion 110 effects the shift from the normal mode to the power saving mode.

Further, upon receiving, from a restoration condition detection portion, a restoration signal indicating that a restoration condition from the power saving mode to the normal mode is met, the power source portion 130 restarts power supply to all the power-supplied portions 150 (performs restoration from the power saving mode to the normal mode). The power source portion 130 receives a restoration signal from the restoration condition detection portion and thus, even in the power saving mode, continues power supply to the restoration condition detection portion.

Portions corresponding to the restoration condition detection portion include the operation panel 103 and the communication portion 120. Upon accepting an operation in the power saving mode, the operation panel 103 transmits a restoration signal to the power source portion 130. Furthermore, upon receiving a communication request from the user terminal 200 in the power saving mode, the communication portion 120 transmits a restoration signal to the power source portion 130.

Moreover, though not shown, a detection portion for detecting an open state/closed state of an apparatus cover (for example, a cover that is opened for clearing a paper jam or for toner replacement), a detection portion for detecting an open state/closed state of the original document cover 12, a detection portion for detecting a mounted state/demounted state of the paper sheet cassette 25, and so on each also function as the restoration condition detection portion. That is, in the power saving mode, when various types of covers such as the original document cover 12 are opened/closed or when the paper sheet cassette 25 is mounted/demounted, the power source portion 130 performs restoration from the power saving mode to the normal mode.

<Retention of Printing Job>

In a case where the image forming apparatus 100 is used as a printer (in a case where the printer function is used), a printing job is outputted from the user terminal 200 and received by the communication portion 120. Then, the printing job received by the communication portion 120 is managed by the job management portion 140 (see FIG. 3).

The job management portion 140 is connected to the control portion 110 and operates under an instruction from the control portion 110. The job control portion 140 has a holding region (queue) and holds the printing job in the holding region. Then, the job management portion 140 outputs the printing job (image data) to the image processing portion 112. At this time, in a case of holding a plurality of printing jobs, the job management portion 140 outputs them to the image processing portion 112 in the order starting from an earliest held one of the printing jobs (image data). After that, the image data is processed at the image processing portion 112, and the image data after having been processed is outputted to the printing portion 102. Thus, a printing process based on the printing job from the user terminal 200 is performed by the printing portion 102.

Here, in some cases, at a point in time when the image forming apparatus 100 (communication portion 120) receives a printing job from the user terminal 200, the image forming apparatus 100 is in a state of being unable to perform printing. For example, when an error such as a paper jam, running out of paper sheets, or running out of toner is occurring in the image forming apparatus 100, the image forming apparatus 100 is unable to perform printing. In this case, the job management portion 140 keeps holding the printing job received from the user terminal 200. From this time on, every time the image forming apparatus 100 (communication portion 120) newly receives a printing job from the user terminal 200, the printing job also is kept held in the job management portion 140. Thus, in the image forming apparatus 100, those printing jobs are retained in an yet-to-be-executed state.

An error that has occurred in the image forming apparatus 100 is resolved by an error resolving procedure performed by a user. Further, once the error that had occurred in the image forming apparatus 100 has been resolved, printing by the image forming apparatus 100 is enabled. When an error that had occurred in the image forming apparatus 100 has been resolved, however, even in a case where there is a printing job retained in an yet-to-be-executed state in the image forming apparatus 100 (job management portion 140), a printing process based on the retained printing job is not performed in an automatic manner. The reason for this is that, when a printing process based on a retained printing job is performed in an automatic manner, there is a danger that printed matter based on the retained printing job might be exposed to an indefinite number of users (security concerns might arise).

For this reason, when and after an error that had occurred in the image forming apparatus 100 has been resolved, even in a case where there is a printing job retained in an yet-to-be-executed state in the job management portion 140, until the operation panel 103 accepts an instruction to execute a printing process based on the retained printing job, the control portion 110 controls the printing portion 102 not to perform the printing process based on the retained printing job. For example, when accepting an instruction to execute a printing process based on a retained printing job, the operation panel 103 displays a job selection screen (not shown) on which information related to retained printing jobs (a name, a transmission source, and so on of each of the retained jobs) is presented in the form of options. Then, the control portion 110 controls the printing portion 102 to perform the printing process based on the retained printing job as selected on the job selection screen. The rest of the retained printing jobs left unselected at this time is kept retained in the job management portion 140.

<Acceptance of Last Exit Report>

At least one of the plurality of image forming apparatuses 100 in the image forming system 100S accepts a last exit report from a last exiting person who is a user exiting last from an installation area of the image forming system 100S. For example, a report accepting image forming apparatus 100 that accepts a last exit report stores a list 10L (see FIG. 3) indicating the plurality of image forming apparatuses 100 constituting the image forming system 100S and is set to be able to accept a last exit report. There is no particular limitation on the number of the report accepting image forming apparatuses 100, and one or not less than two (including "all") of the image forming apparatuses 100 may be the report accepting image forming apparatuses 100.

Figure 4:
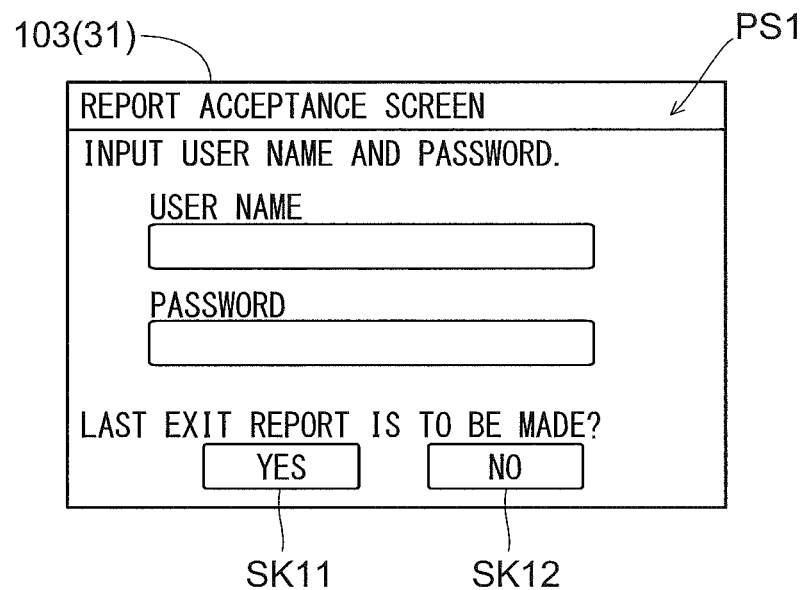
FIG. 4 is a diagram showing one example of a screen (report acceptance screen) displayed by the image forming apparatus according to the one embodiment of the present disclosure at the time of accepting a last exit report.

When accepting a last exit report, the control portion 110 of the report accepting image forming apparatus 100 controls the operation panel 103 to display a report acceptance screen PS1 shown in FIG. 4. On the report acceptance screen PS1, input fields for inputting user information (a user name and a password) are presented. That is, the operation panel 103 accepts a last exit report and also accepts an input of user information at the time of accepting a last exit report. In this configuration, the operation panel 103 corresponds to an "acceptance portion".

Upon a piece of user information being inputted on the report acceptance screen PS1 and an operation of touching a soft key SK11 presented on the report acceptance screen PS1 (an operation of making a last exit report) being performed, the control portion 110 of the report accepting image forming apparatus 100 judges whether or not, among a plurality of pieces of user information pre-registered, there is a match for the piece of user information inputted on the report acceptance screen PS1. When, as a result of the judgement, it is found that there is a match for the piece of user information inputted on the report acceptance screen PS1, the control portion 110 of the report accepting image forming apparatus 100 judges that a last exit report has been properly made and recognizes that a user corresponding to the piece of user information inputted on the report acceptance screen PS1 is a last exiting person. On the other hand, when it is found that there is no match for the piece of user information inputted on the report acceptance screen PS1, the control portion 110 of the report accepting image forming apparatus 100 does not judge that a last exit report has been made. In this case, the control portion 110 of the report accepting image forming apparatus 100 instructs, for example, the operation panel 103 of the report accepting image forming apparatus 100 itself to notify that the piece of user information is wrong or to prompt for reentry of a piece of user information (for example, to display a notification message).

In a case where an operation of touching a soft key SK12 presented on the report acceptance screen PS1 (an operation of not making a last exit report) has been performed, the operation panel 103 of the report accepting image forming apparatus 100 deletes the piece of user information that has already been inputted on the report acceptance screen PS1 (prepares itself for reentry of a piece of user information). Or alternatively, the operation panel 103 of the report accepting image forming apparatus 100 completes accepting a last exit report (completes displaying the report acceptance screen PS1).

<Execution of Last Exit Process>

The control portion 110 of the report accepting image forming apparatus 100 that has accepted a last exit report executes a preset last exit process as a process to be executed when a last exiting person exits from the installation area of the image forming system 100S. Furthermore, the control portion 110 of the report accepting image forming apparatus 100 that has accepted the last exit report instructs the communication portion 120 of the report accepting image forming apparatus 100 itself to transmit, to any other apparatus than the report accepting image forming apparatus 100 itself in the image forming system 100S listed on the list 10L, a last exit notification including a command for commanding the any other apparatus to execute the last exit process. That is, the control portion 110 of the report accepting image forming apparatus 100 that has accepted the last exit report performs control so that the any other apparatus than the report accepting image forming apparatus 100 itself in the image forming apparatus 100S also executes the last exit process. When transmitting the last exit notification to the any other apparatus than the report accepting image forming apparatus 100 itself in the image forming system 100, the control portion 110 of the report accepting image forming apparatus 100 that has accepted the last exit report includes information indicating a last exiting person in the last exit notification so that the any other apparatus than the report accepting image forming apparatus 100 itself also recognizes the last exiting person. The following describes the last exit process.

First, as a first example, there is a case where, in any one of the plurality of image forming apparatuses 100 in the image forming system 100S (including the report accepting image forming apparatus 100 that has accepted a last exit report), a printing job of a last exiting person has been retained in an yet-to-be-executed state. In this case, the control portion 110 of the any one of the plurality of image forming apparatuses 100 executes, as the last exit process, a printing process (retained printing job process) based on the printing job of the last exiting person. That is, the control portion 110 of the any one of the plurality of image forming apparatuses 100 controls the printing portion 102 of the any one of the plurality of image forming apparatuses 100 itself to execute the printing process based on the printing job of the last exiting person.

For example, the any one of the plurality of image forming apparatuses 100 that executes, as the last exit process, the printing process (retained printing job process) based on the printing job of the last exiting person is the report accepting image forming apparatus 100 that has accepted the last exit report. In this case, when the report accepting image forming apparatus 100 itself holds the printing job of the last exiting person in the yet-to-be-executed state, the report accepting image forming apparatus 100 that has accepted the last exit report executes, as the last exit process, the printing process (retained printing job process) based on the printing job of the last exiting person.

On the other hand, when the printing job of the last exiting person is held in the yet-to-be-executed state in any other apparatus, the report accepting image forming apparatus 100 that has accepted the last exit report receives a transmission of the printing job of the last exiting person from the any other apparatus holding the printing job of the last exiting person in the yet-to-be-executed state. That is, when holding the printing job of the last exiting person in the yet-to-be-executed state, the any other image forming apparatus 100 than the report accepting image forming apparatus 100 that has accepted the last exit report executes, as the last exit process, a process (retained printing job process) of transmitting the printing job of the last exiting person to the report accepting image forming apparatus 100 that has accepted the last exit report. Then, the report accepting image forming apparatus 100 that has accepted the last exit report executes, as the last exit process, the printing process (retained printing job process) based on the printing job of the last exiting person transmitted from the any other apparatus.

A configuration also may be adopted in which in one of the plurality of image forming apparatuses 100 in the image forming system 100, which holds a printing job of a last exiting person, a printing process based on the printing job of the last exiting person is executed as the last exit process. In this case, it is no longer required to transmit the printing job of the last exiting person to the report accepting image forming apparatus 100 that has accepted a last exit report.

Figure 5:
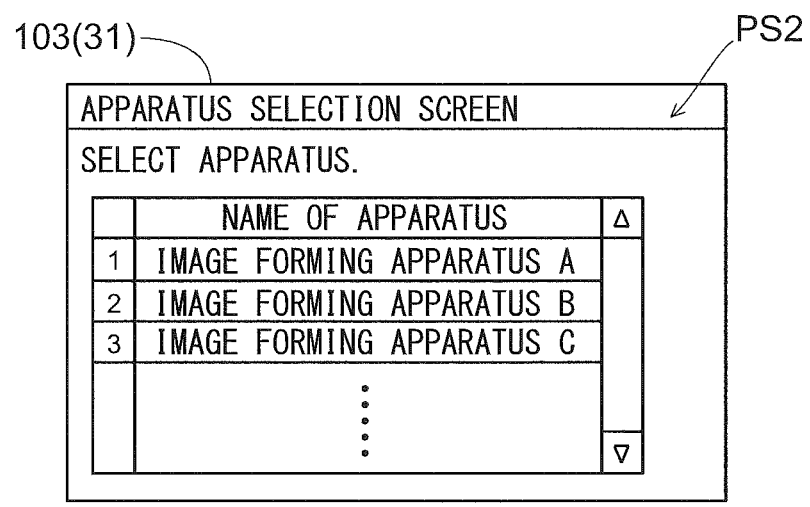
FIG. 5 is a diagram showing one example of a screen (apparatus selection screen) displayed by the image forming apparatus according to the one embodiment of the present disclosure at the time of accepting the last exit report.

Or alternatively, a configuration also may be adopted in which in one of the plurality of image forming apparatuses 100 in the image forming system 100, which has been selected by a last exiting person, a printing process based on a printing job of the last exiting person is executed as the last exit process. In a case of adopting this configuration, the control portion 110 of the report accepting image forming apparatus 100 instructs the operation panel 103 of the report accepting image forming apparatus 100 itself to display an apparatus selection screen PS2 shown in FIG. 5. For example, the apparatus selection screen PS2 is displayed by touching the soft key SK11 on the report acceptance screen PS1 (or displayed by touching a soft key SK31 on an after-mentioned printing/deletion selection screen PS3). On the apparatus selection screen PS2, the plurality of image forming apparatuses 100 listed on the list 10L (the plurality of image forming apparatuses 100 in the image forming system 100S) are presented as options.

Information indicating a result of a selection on the apparatus selection screen PS2 is included in a last exit notification outputted from the report accepting image forming apparatus 100 that has accepted a last exit report. Thus, any other image forming apparatus 100 than the report accepting image forming apparatus 100 that has accepted the last exit report also recognizes the result of the selection on the apparatus selection screen PS2 (one of the image forming apparatuses 100 that is to execute a printing process based on a printing job of a last exiting person). Then, when selected on the apparatus selection screen PS2, one of the image forming apparatuses 100 that holds the printing job of the last exiting person in an yet-to-be-executed state itself executes, as the last exit process, a printing process (retained printing job process) based on the printing job of the last exiting person.

On the other hand, when any other apparatus than the one of the image forming apparatuses 100 itself that holds the printing job of the last exiting person in the yet-to-be-executed state is selected on the apparatus selection screen PS2, the one of the image forming apparatuses 100 that holds the printing job of the last exiting person in the yet-to-be-executed state executes, as the last exit process, a process (retained printing job process) of transmitting the printing job of the last exiting person to the any other image forming apparatus 100 selected on the apparatus selection screen PS2. Then, the any other image forming apparatus 100 selected on the apparatus selection screen PS2 executes, as the last exit process, a printing process (retained printing job process) based on the printing job of the last exiting person transmitted from the one of the image forming apparatuses 100 other than itself.

Figure 6:
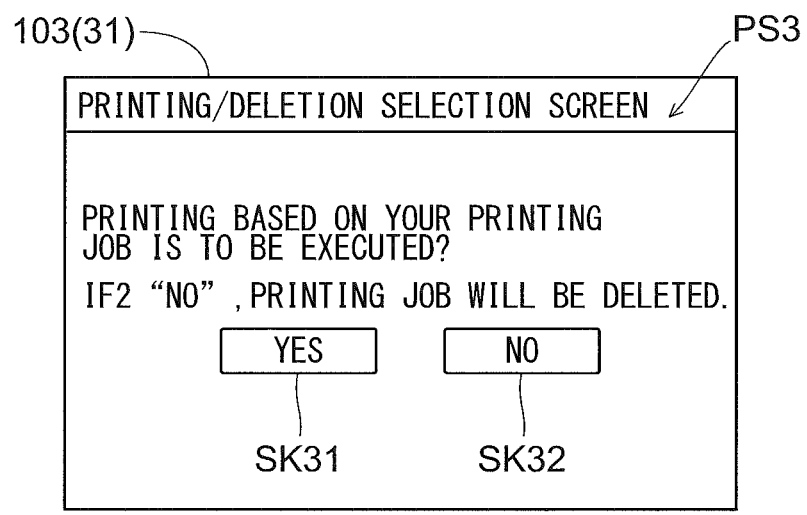
FIG. 6 is a diagram showing one example of a screen (printing/deletion selection screen) displayed by the image forming apparatus according to the one embodiment of the present disclosure at the time of accepting the last exit report.

Moreover, a configuration may be adopted in which, when a printing job of a last exiting person is held in an yet-to-be-executed state in any one of the plurality of image forming apparatuses 100, the printing job of the last exiting person is deleted in the yet-to-be-executed state. In a case of adopting this configuration, the control portion 110 of the report accepting image forming apparatus 100 instructs the operation panel 103 of the report accepting image forming apparatus 100 itself to display the printing/deletion selection screen PS3 shown in FIG. 6. For example, on the printing/deletion selection screen PS3, the soft key SK31 for instructing execution of printing based on a printing job of a last exiting person and a soft key SK32 for instructing deletion of a printing job of a last exiting person are presented.

Information indicating a result of a selection on the printing/deletion selection screen PS3 is included in a last exit notification outputted from the report accepting image forming apparatus 100 that has accepted a last exit report. Thus, any other image forming apparatus than the report accepting image forming apparatus 100 that has accepted the last exit report also recognizes the result of the selection on the printing/deletion selection screen PS3 (whether or not a printing job of a last exiting person is to be deleted). Then, in a case where a selection is made to delete the printing job of the last exiting person at the time of accepting the last exit report, one of the image forming apparatuses 100 that holds the printing job of the last exiting person in an yet-to-be-executed state executes, as the last exit process, a process (retained printing job process) of deleting the printing job of the last exiting person.

As a second example, there is a case where, in any one of the plurality of image forming apparatuses 100 in the image forming system 100S (including the report accepting image forming apparatus 100 that has accepted a last exit report), a printing job of a non-last exiting person other than a last exiting person is retained in an yet-to-be-executed state. In this case, the any one of the plurality of image forming apparatuses 100 that holds the printing job of the non-last exiting person executes, as the last exit process, a process (retained printing job process) of deleting the printing job of the non-last exiting person.

Furthermore, the respective control portions 110 of the plurality of image forming apparatuses 100 in the image forming system 100S execute, as the last exit process (power source process), a process of shutting down power supply to the power-supplied portions 150 or a process of shifting the power supply mode from the normal mode to the power saving mode. That is, the control portion 110 of each of the plurality of image forming apparatuses 100 controls the power source portion 130 of the each of the plurality of image forming apparatuses 100 itself to execute the process of shutting down power supply to the power-supplied portions 150 or the process of shifting the power supply mode from the normal mode to the power saving mode.

<Flow of Last Exit Process>

Hereinafter, a description is given on the assumption that the image forming system 100S is composed of image forming apparatuses 100A, 100B, and 100C.

Figure 7:
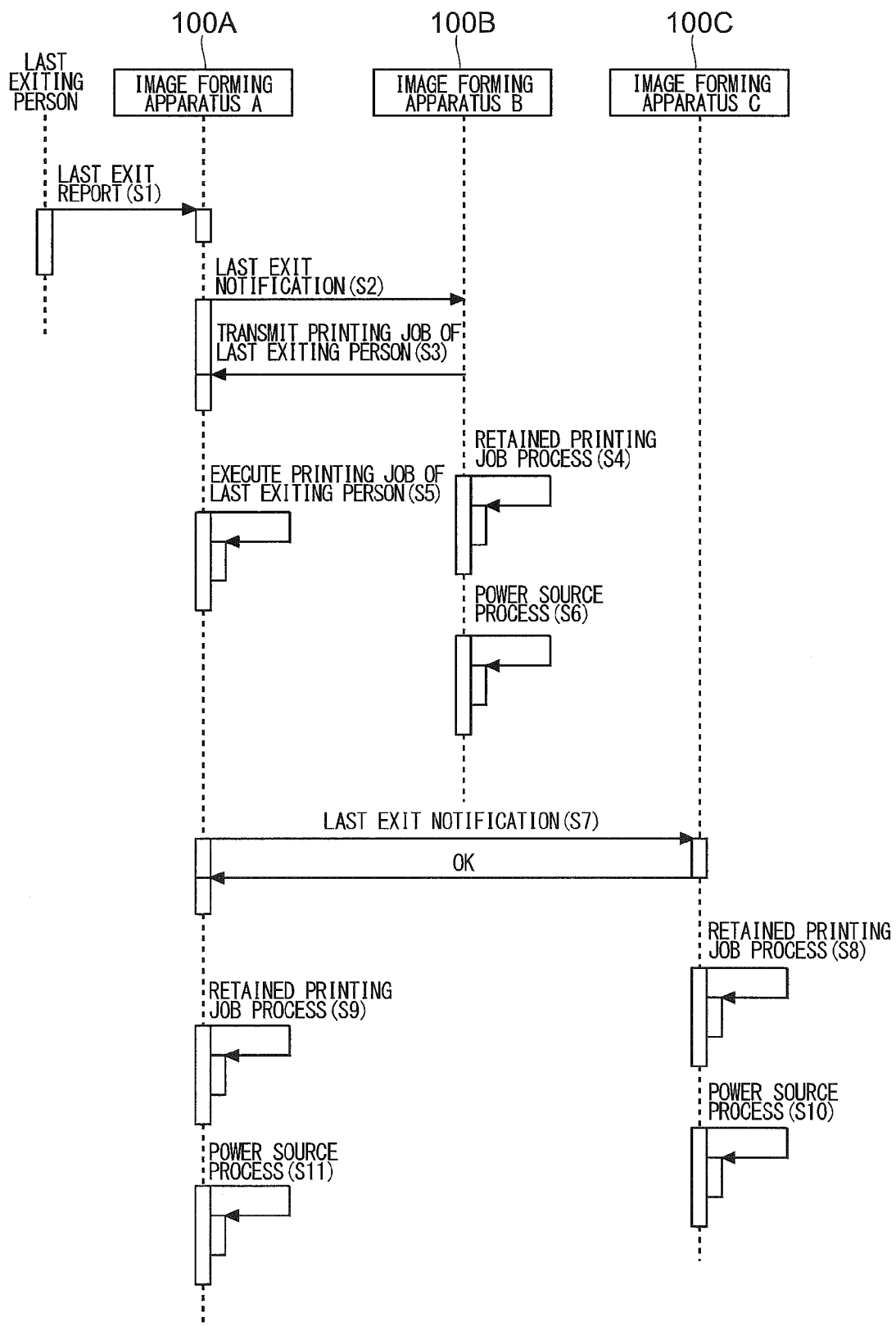
FIG. 7 is a sequence diagram for explaining a last exit process performed by a plurality of image forming apparatuses in the image forming system according to the one embodiment of the present disclosure.

First, with reference to a sequence diagram shown in FIG. 7, a configuration is described in which, among the plurality of image forming apparatuses 100 in the image forming system 100S, in the report accepting image forming apparatus 100 that has accepted a last exit report, a printing process based on a printing job of a last exiting person is executed.

When a last exiting person exits from the installation area of the image forming system 100S, the last exiting person makes a last exit report to the report accepting image forming apparatus 100 among the plurality of image forming apparatuses 100 (S1). Here, it is assumed that the image forming apparatus 100A has accepted the last exit report. Upon accepting the last exit report, the image forming apparatus 100A transmits a last exit notification to the image forming apparatus 100B (S2).

After having received the last exit notification, the image forming apparatus 100B judges whether or not the image forming apparatus 100B itself holds a printing job of the last exiting person. Here, it is assumed that the image forming apparatus 100B holds the printing job of the last exiting person. Accordingly, the image forming apparatus 100B judges that the image forming apparatus 100B itself holds the printing job of the last exiting person. In this case, the image forming apparatus 100B executes, as a last exit process, a process of transmitting the printing job of the last exiting person in a yet-to-be-executed state to the image forming apparatus 100A (S3).

Moreover, the image forming apparatus 100B judges whether or not the image forming apparatus 100B itself holds a printing job of a non-last exiting person. Then, when it is judged that the image forming apparatus 100B itself holds the printing job of the non-last exiting person, the image forming apparatus 100B executes, as the last exit process (retained printing job), a process of deleting the printing job of the non-last exiting person in an yet-to-be-executed state (S4).

Upon receiving the printing job of the last exiting person from the image forming apparatus 100B, the image forming apparatus 100A executes, as the last exit process (retained printing job), a printing process based on the printing job of the last exiting person (S5).

Upon completion of the retained printing job process, the image forming apparatus 100B executes, as the last exit process (power source process), a process of shutting down power supply to the power-supplied portions 150 or a process of shifting the power supply mode from the normal mode to the power saving mode (S6).

The image forming apparatus 100A transmits the last exit notification not only to the image forming apparatus 100B but also to the image forming apparatus 100C (S7). After having received the last exit notification, the image forming apparatus 100C judges whether or not the image forming apparatus 100C itself holds the printing job of the last exiting person. Here, it is assumed that the image forming apparatus 100C does not hold the printing job of the last exiting person. Accordingly, the image forming apparatus 100C judges that the image forming apparatus 100O itself does not hold the printing job of the last exiting person. In this case, in response to the last exit notification, the image forming apparatus 100C returns only an OK response to the image forming apparatus 100A (the printing job is not transmitted thereto).

Moreover, the image forming apparatus 100C judges whether or not the image forming apparatus 100C itself holds a printing job of a non-last exiting person. Then, when it is judged that the image forming apparatus 100C itself holds the printing job of the non-last exiting person, the image forming apparatus 100C executes, as the last exit process (retained printing job), a process of deleting the printing job of the non-last exiting person in an yet-to-be-executed state (S8).

Here, from the image forming apparatus 100C, the printing job of the last exiting person, which is to be executed, is not transmitted to the image forming apparatus 100A (only the OK response is returned thereto). In this case, the image forming apparatus 100A shifts to a process for judging whether or not the image forming apparatus 100A itself holds the printing job of the last exiting person. Then, when it is judged that the image forming apparatus 100A itself holds the printing job of the last exiting person, the image forming apparatus 100A executes, as the last exit process (retained printing job process), a printing process based on the printing job of the last exiting person. Moreover, the image forming apparatus 100A judges whether or not the image forming apparatus 100A itself holds a printing job of a non-last exiting person. When, as a result of the judgment, it is found that the image forming apparatus 100A itself holds the printing job of the non-last exiting person, the image forming apparatus 100A executes, as the last exit process (retained printing job process), a process of deleting the printing job of the non-last exiting person in an yet-to-be-executed state (S9).

Upon completion of the retained printing job process, the image forming apparatus 100C executes, as the last exit process (power source process), a process of shutting down power supply to the power-supplied portions 150 or a process of shifting the power supply mode from the normal mode to the power saving mode (S10). After this, the image forming apparatus 100A executes, as the last exit process (power source process), a process of shutting down power supply to the power-supplied portions 150 or a process of shifting the power supply mode from the normal mode to the power saving mode (S11).

Figure 8:
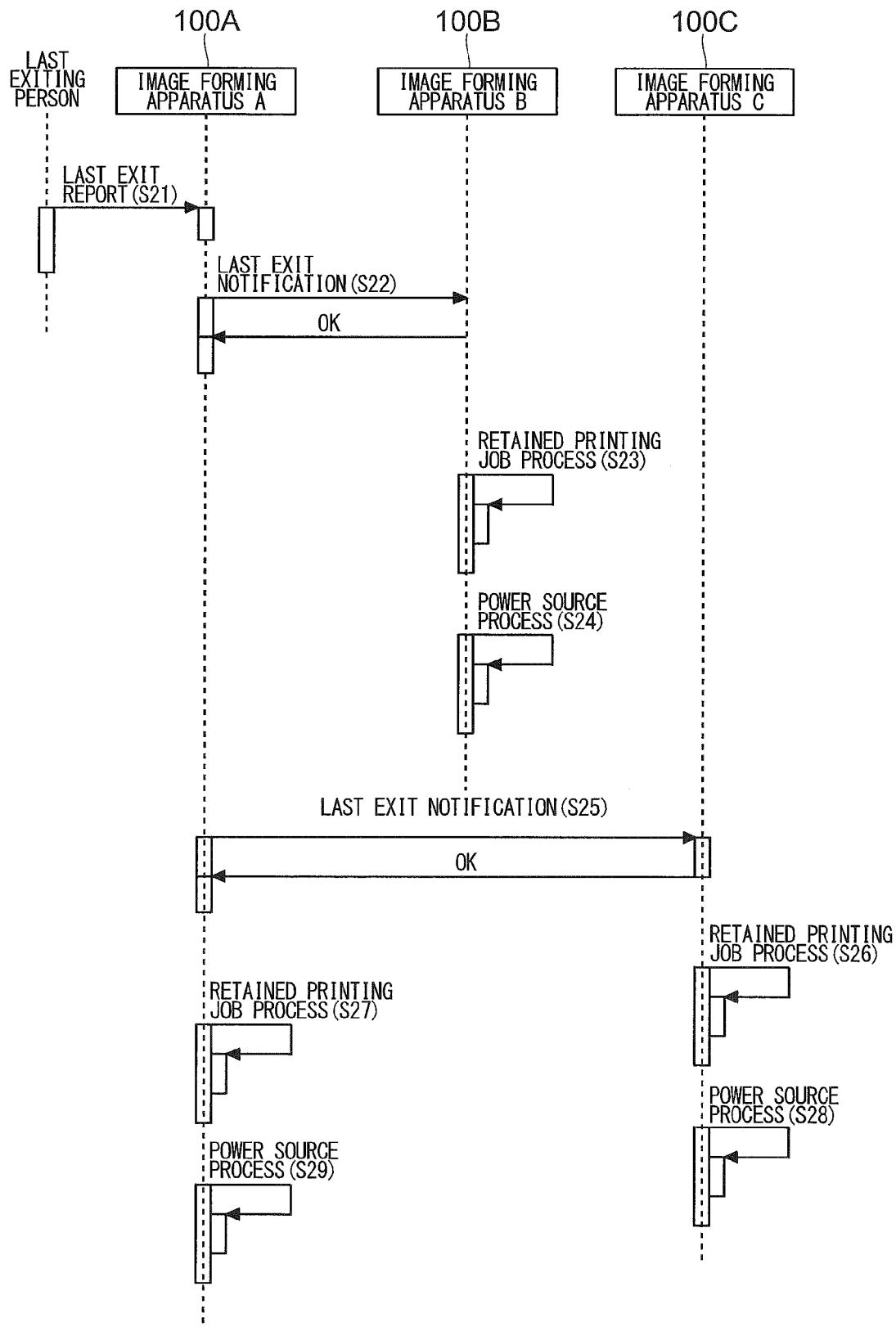
FIG. 8 is a sequence diagram for explaining a last exit process performed by the plurality of image forming apparatuses in the image forming system according to the one embodiment of the present disclosure.

Next, with reference to a sequence diagram shown in FIG. 8, a configuration is described in which in one of the plurality of image forming apparatuses 100 in the image forming system 100S, which holds a printing job of a last exiting person, a printing process based on the printing job of the last exiting person is executed.

When a last exiting person exits the installation area of the image forming system 100S, the last exiting person makes a last exit report to the report accepting image forming apparatus 100 among the plurality of image forming apparatuses 100 (S21). Here, it is assumed that the image forming apparatus 100A has accepted the last exit report. Upon accepting the last exit report, the image forming apparatus 100A transmits a last exit notification to the image forming apparatus 100B (S22).

Upon receiving the last exit notification, the image forming apparatus 100B returns an OK response to the image forming apparatus 100A. Then, the image forming apparatus 100B executes, as a last exit process, a retained printing job (S23). At this time, when holding a printing job of the last exiting person, the image forming apparatus 100B executes, as the last exit process (retained printing job process), a printing process based on the printing job of the last exiting person or a process of deleting the printing job of the last exiting person. Whether the printing process or the deletion process is to be executed is determined based on a result of a selection on the printing/deletion selection screen PS3 (see FIG. 6). Moreover, when the image forming apparatus 100B itself holds a printing job of a non-last exiting person, the image forming apparatus 100B executes, as the last exit process (retained printing job process), a process of deleting the printing job of the non-last exiting person.

Upon completion of the retained printing job process, the image forming apparatus 100B executes, as the last exit process (power source process), a process of shutting down power supply to the power-supplied portions 150 or a process of shifting the power supply mode from the normal mode to the power saving mode (S24).

The image forming apparatus 100A transmits the last exit notification not only to the image forming apparatus 100B but also to the image forming apparatus 100C (S25). Upon receiving the last exit notification, the image forming apparatus 100C returns an OK response to the image forming apparatus 100A. Then, similarly to the image forming apparatus 100B, the image forming apparatus 100C executes, as the last exit process, a retained printing job process (S26).

Furthermore, after having received the OK response from the image forming apparatus 100C, the image forming apparatus 100A executes, as the last exit process, a retained printing job process (S27). That is, when holding a printing job of a last exiting person, the image forming apparatus 100A executes, as the last exit process (retained printing job process), a printing process based on the printing job of the last exiting person or a process of deleting the printing job of the last exiting person. Moreover, when the image forming apparatus 100A itself holds a printing job of a non-last exiting person, the image forming apparatus 100A executes, as the last exit process (retained printing job process), a process of deleting the printing job of the non-last exiting person.

Upon completion of the retained printing job process, the image forming apparatus 100C executes, as the last exit process (power source process), a process of shutting down power supply to the power-supplied portions 150 or a process of shifting the power supply mode from the normal mode to the power saving mode (S28). After this, the image forming apparatus 100A executes, as the last exit process (power source process), a process of shutting down power supply to the power-supplied portions 150 or a process of shifting the power supply mode from the normal mode to the power saving mode (S29).

In this embodiment, as described above, at least one of the plurality of image forming apparatuses 100 in the image forming system 100S is the report accepting image forming apparatus 100 that accepts a last exit report from a last exiting person, and thus without the need for separately providing an apparatus for detecting a user's exit (for example, an apparatus that reads an ID card owned by a user to manage the user's exit) in the image forming system 100S, it is possible to detect a last exiting person.

Furthermore, the report accepting image forming apparatus 100 that has accepted a last exit report (one of the image forming apparatuses 100 that has detected a last exiting person) executes a last exit process preset as a process to be executed at the time of exit of the last exiting person. Moreover, upon receiving a last exit notification from the report accepting image forming apparatus 100 that has accepted the last exit report, any other image forming apparatus 100 than the report accepting image forming apparatus 100 that has accepted the last exit report executes a last exit process. With this configuration, without the need for separately providing a management server or the like that integrally manages the plurality of image forming apparatuses 100 in the image forming system 100S, it is possible to control the plurality of image forming apparatuses 100 in the image forming system 100S to execute the last exit process.

With this configuration, without requiring the image forming system 100S to have a complicated (larger scale) configuration, it is possible to control the plurality of the image forming apparatuses 100 in the image forming system 100S to execute the process (last exit process) to be executed when a last exiting person exits from the installation area of the image forming system 100S.

Furthermore, in this embodiment, as described above, at the time of accepting a last exit report, the report accepting image forming apparatus 100 accepts an input of user information by a last exiting person and thereby recognizes the last exiting person. Furthermore, the report accepting image forming apparatus 100 that has accepted the last exit report includes information indicating the last exiting person in a last exit notification so that any other apparatus than the report accepting image forming apparatus 100 itself listed on the list 10L also recognizes the last exiting person. Further, in a case where any one of the plurality of image forming apparatuses 100 holds a printing job of the last exiting person in an yet-to-be-executed state, the any one of the plurality of image forming apparatuses 100 executes, as the last exit process, a printing process based on the printing job of the last exiting person. With this configuration, from the standpoint of a last exiting person, printed matter based on his/her own printing job, which had been retained for some reason, can be obtained merely by making a last exit report, and thus increased convenience is provided. Moreover, in no case is a printing job left in a retained state (a state in which a printing job is held in any one of the plurality of image forming apparatuses 100), and thus it is also possible to prevent a printing process based on a printing job of a last exiting person from being executed by a malicious user.

Furthermore, in this embodiment, as described above, one of the image forming apparatuses 100 that executes, as the last exit process, a printing process based on a printing job of a last exiting person is the report accepting image forming apparatus 100 that has accepted a last exit report. Furthermore, in a case where the printing job of the last exiting person is held in an yet-to-be executed state in any other image forming apparatus 100 than the report accepting image forming apparatus 100 that has accepted the last exit report, the aforementioned any other image forming apparatus 100 that holds the printing job of the last exiting person in the yet-to-be-executed state executes, as the last exit process, a process of transmitting the printing job of the last exiting person to the report accepting image forming apparatus 100 that has accepted the last exit report. With this configuration, from the standpoint of a last exiting person, printed matter can be obtained at the same image forming apparatus 100 as that to which a last exit report has been made (there is no need for moving toward any other image forming apparatus 100), and thus increased convenience is provided.

Furthermore, in this embodiment, as described above, at the time of accepting a last exit report, the report accepting image forming apparatus 100 accepts a selection as to whether or not a printing job of a last exiting person is to be deleted (a selection on the printing/deletion selection screen PS3). Furthermore, the report accepting image forming apparatus 100 that has accepted the last exit report includes information indicating a result of the selection (a result of the selection on the printing/deletion selection screen PS3) in a last exit notification so that any other apparatus than the report accepting image forming apparatus 100 itself in the image forming system 100S listed on the list 10L also recognizes the result of the selection (the result of the selection on the printing/deletion selection screen PS3). Further, in a case where a selection is made to delete the printing job of the last exiting person at the time of accepting the last exit report, one of the image forming apparatuses 100 that holds the printing job of the last exiting person in an yet-to-be-executed state executes, as the last exit process, a process of deleting the printing job of the last exiting person in the yet-to-be-executed state. Here, in some cases, a last exiting person may want to delete his/her own printing job that has been retained in an yet-to-be-executed state. In such a case, it would be a waste of paper sheets to output printed matter based on the printing job of the last exiting person. It is, therefore, preferable that a selection can be made as to whether or not a printing job of a last exiting person is to be deleted at the time of accepting a last exit report.

Furthermore, in this embodiment, as described above, in a case where any one of the plurality of image forming apparatuses 100 in the image forming system 100S holds a printing job of a non-last exiting person other than a last exiting person in an yet-to-be-executed state, the any one of the image forming apparatuses 100 that holds the printing job of the non-last exiting person executes, as the last exit process, a process of deleting the printing job of the non-last exiting person in the yet-to-be-executed state. With this configuration, it is also possible to prevent a printing process based on a printing job of a non-last exiting person from being executed by a malicious user.

Furthermore, in this embodiment, as described above, the plurality of image forming apparatuses 100 in the image forming system 100S execute, as the last exit process, a process of shutting down power supply to the power-supplied portions 150 or a process of shifting the power supply mode from the normal mode to the power saving mode. With this configuration, from the standpoint of a last exiting person, merely by making a last exit report, all the image forming apparatuses 100 in the image forming system 100S shut down power supply to the power-supplied portions 150, or a shift is made from the normal mode to the power saving mode, and thus increased convenience is provided. Furthermore, when and after a last exiting person has exited from the installation area of the image forming system 100S, in no case is power left supplied as per normal to the plurality of image forming apparatuses 100 in the image forming apparatus 100S, and thus it is possible to suppress wasteful power consumption.

The embodiment disclosed herein is to be construed in all respects as illustrative and not limiting. The scope of the present disclosure is indicated by the appended claims rather than by the foregoing description of the embodiment, and all changes that come within the meaning and range of equivalency of the claims are intended to be embraced therein.

What is claimed is:

1. An image forming system comprising a plurality of image forming apparatuses communicably connected to each other,
    wherein
    each of the plurality of image forming apparatuses is an image forming apparatus that executes a printing process based on a printing job,
    at least one of the plurality of image forming apparatuses is a report accepting image forming apparatus that accepts a last exit report from a last exiting person who exits last from an installation area of the image forming system,
    the report accepting image forming apparatus
    stores a list indicating the plurality of image forming apparatuses,
    accepts an input of user information by the last exiting person and an operation of making a last exit report and thereby recognizes the last exiting person and accepts the last exit report, and
    accepts an input for selecting, out of the plurality of image forming apparatuses, an image forming apparatus that executes a printing process based on a printing job of the last exiting person, and
    upon accepting the last exit report, the report accepting image forming apparatus executes a last exit process preset as a process to be executed when the last exiting person exits from the installation area and transmits, to any other of the plurality of image forming apparatuses listed on the list, a last exit notification including information indicating the last exiting person and a command for commanding the any other of the plurality of image forming apparatuses to execute the last exit process so that the any other of the plurality of image forming apparatuses listed on the list also recognizes the last exiting person and executes the last exit process,
    in a case where the printing job of the last exiting person is held in the yet-to-be-executed state in any other of the image forming apparatuses than the image forming apparatus selected by the last exiting person, the any other of the image forming apparatuses that holds the printing job of the last exiting person in the yet-to-be-executed state executes, as the last exit process, a process of transmitting the printing job of the last exiting person to the image forming apparatus selected by the last exiting person, and the image forming apparatus selected by the last exiting person executes the printing process based on the printing job of the last exiting person transmitted from the any other of the image forming apparatuses than the image forming apparatus selected by the last exiting person, and
    in a case where the printing job of the last exiting person is held in the yet-to-be-executed state in the image forming apparatus selected by the last exiting person, the image forming apparatus selected by the last exiting person executes, as the last exit process, the printing process based on the printing job of the last exiting person transmitted.

2. The image forming system according to claim 1, wherein
    in a case where any one of the plurality of image forming apparatuses holds a printing job of a non-last exiting person other than the last exiting person in an yet-to-be-executed state, the any one of the plurality of image forming apparatuses that holds the printing job of the non-last exiting person executes, as the last exit process, a process of deleting the printing job of the non-last exiting person in the yet-to-be-executed state.

3. The image forming system according to claim 1, wherein
    each of the plurality of image forming apparatuses is an image forming apparatus that is equipped with a normal mode in which power supply to a power-supplied portion that operates using power supplied thereto is performed in a normal manner and a power saving mode in which the power supply to the power-supplied portion is restricted to a level lower than that in the normal mode, and
    the plurality of image forming apparatuses execute, as the last exit process, a process of shutting down the power supply to the power-supplied portion or a process of effecting a shift from the normal mode to the power saving mode.

4. An image forming apparatus in an image forming system comprising a plurality of image forming apparatuses communicably connected to each other and each executing a printing process based on a printing job, comprising:
    a communication portion that communicates with any other of the plurality of image forming apparatuses in the image forming system;
    a storage portion that stores a list indicating the plurality of image forming apparatuses;
    a reception portion that accepts a last exit report from a last exiting person who exits last from an installation area of the image forming system; and
    a control portion that executes a last exit process preset as a process to be executed when the last exiting person exits from the installation area,
    wherein
    the control portion accepts an input of user information by the last exiting person and an operation of making a last exit report and thereby recognizes the last exiting person and accepts the last exit report,
    the control portion accepts an input for selecting, out of the plurality of image forming apparatuses, an image forming apparatus that executes a printing process based on a printing job of the last exiting person,
    upon the reception portion accepting the last exit report, the control portion executes the last exit process and instructs the communication portion to transmit, to the any other of the plurality of image forming apparatuses listed on the list, a last exit notification including information indicating the last exiting person and a command for commanding the any other of the plurality of image forming apparatuses to execute the last exit process so that the any other of the plurality of image forming apparatuses listed on the list also recognizes the last exiting person and executes the last exit process,
    in a case where a given image forming apparatus is selected by the last exiting person as the image forming apparatus that executes the printing process based on the printing job of the last exiting person, when the printing job of the last exiting person is held in the yet-to-be-executed state in the given image forming apparatus, the control portion executes, as the last exit process, the printing process based on the printing job of the last exiting person and when the printing job of the last exiting person is held in the yet-to-be-executed state in the any other of the plurality of image forming apparatuses, the control portion executes, as the last exit process, the printing process based on the printing job of the last exiting person transmitted from the any other of the plurality of image forming apparatuses, and in a case where the any other of the plurality of image forming apparatuses is selected by the last exiting person as the image forming apparatus that executes the printing process based on the printing job of the last exiting person, when the printing job of the last exiting person is held in the yet-to-be-executed state in the given image forming apparatus, the control portion executes, as the last exit process, a process of transmitting the printing job of the last exiting person to the any other of the plurality of image forming apparatuses that is selected.

* * * * *